United States Patent [19]

Hayatsu et al.

[11] Patent Number: 4,460,475
[45] Date of Patent: Jul. 17, 1984

[54] METHOD FOR TREATMENT OF MUTAGENS

[75] Inventors: Hikoya Hayatsu, Okayama; Masahide Nakano, Hirakata, both of Japan

[73] Assignee: Sumitomo Chemical Company, Limited, Osaka, Japan

[21] Appl. No.: 479,136

[22] Filed: Mar. 25, 1983

[30] Foreign Application Priority Data

Mar. 30, 1982 [JP] Japan .................................. 57-53384

[51] Int. Cl.$^3$ .............................................. B01D 15/00
[52] U.S. Cl. ..................................... 210/674; 210/692; 210/908; 210/909
[58] Field of Search ........................ 210/679, 690–692, 210/927, 670, 674, 908, 909

[56] References Cited

U.S. PATENT DOCUMENTS 3,794,584  2/1974  Kunin ................................... 210/692
3,852,490  12/1974 Kohn .................................... 210/692
4,381,239  4/1983  Chibata et al. ....................... 210/679

OTHER PUBLICATIONS

Arimoto, Cancer Letters, vol. 11, pp. 29–33, (1980).
Arimoto, Biochemical and Biophysical Research Communications, vol. 92, No. 2, pp. 662–668, (1980).

*Primary Examiner*—Ivars C. Cintins
*Attorney, Agent, or Firm*—Cushman, Darby & Cushman

[57] ABSTRACT

Mutagenic substances in solutions are selectively adsorbed by specific solid adsorbents bearing covalently bound phthalocyanine derivatives. The adsorbents are prepared by coupling the organic solid materials, for instance, cotton and cellulose powder, with phthalocyanine derivatives having chemically reactive terminal groups. Such reactive phthalocyanines are commercially available as phthalocyanine reactive dyes.

12 Claims, No Drawings

METHOD FOR TREATMENT OF MUTAGENS

This invention relates to a method for treatment of a solution containing mutagens, more particularly, relates to a process for selective adsorption of mutagens present substantially in a solution, particularly in a substantially aqueous solution, by solid adsorbents bearing covalently bound phthalocyanine skeletons.

Mutagenic substances that are present in the human environment have become a focus of public concern because of their potential carcinogenic activity. In view of this situation, it is important to develop techniques for eliminating these substances or for separating them from the environment.

It is already reported that hemin and its derivatives inhibit activities of the mutagenic compounds, e.g., Trp-P-1 (3-amino-1,4-dimethyl-5H-pyrido[4,3-b]-indole) and benzo(a)pyrene [Biochem. Biophys. Res. Commun., 92, 662–668 (1980); Cancer Letts., 11,29–33 (1980)]. The authors of these reports have shown also that hemin forms complexes with the mutagens that are subject to this inhibition. In addition, it is proposed that phthalocyanine-polysaccharide complex, prepared by coupling N-(6-aminohexyl)sulfamoyl polysulfo-copper-phthalocyanine compound and agarose gel activated by cyanogen bromide, is used to adsorb mutagenic compounds.

In further search for adsorbent that can be easily prepared and have high efficiency in adsorbing mutagens, it has been discovered that phthalocyanine compounds having certain reactive residues can be easily coupled with organic solid materials and that the resulting materials serve as extremely efficient adsorbent for a range of mutagens.

The present invention is a treatment of mutagenic substances which are substantially present in a solution by use of said modified phthalocyanine compound above. The expression "substantially in a solution" includes the case where there is only a small amount of water enough to moisten the subject as well as the case where there is a large amount of water.

Examples of the reactive terminal groups in this invention are dihalotriazine, monohalotriazine, trihalopyrimidine, sulfato-ethylsulfone, dihaloquinoxaline, dihalopyridazone, sulfato-ethylsulfonamide, mono- or dihalopyrimidine, acrylamide, vinylsulfone, dihalophthalazine, halobenzothiazole and methylolamine. Specific examples of such reactive groups are listed below.

Dihalotriazine;

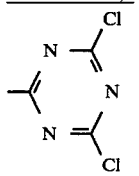

(dichloro-1,3,5-triazinyl)

Monohalotriazine;

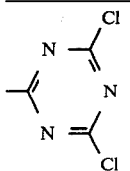

(monochloro-1,3,5-triazinyl)
(R: various kinds of substituent)

Trihalopyrimidine;

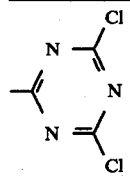

(2,4,5-trichloropyrimidinyl)

Sulfato-ethylsulfone;

—SO$_2$CH$_2$CH$_2$OSO$_3$H  ($\beta$-sulfato-ethylsulfonyl)
—SO$_2$CH$_2$CH$_2$Cl      ($\beta$-chloro-ethylsulfonyl)

Dihaloquinoxaline;

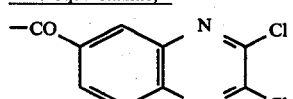

(2,3-dichloroquinoxaline-6-carbonyl)

Dihalopyridazone;

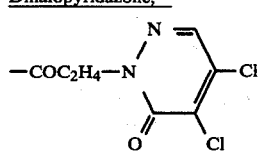

(4,5-dichloro-6-pyridazonylpropionyl)

Sulfato-ethylsulfonamide;

—SO$_2$NHC$_2$H$_4$OSO$_3$H   ($\beta$-sulfato-ethylaminosulfonyl)

Mono- or dihalopyrimidine;

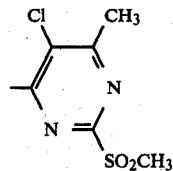

(2-methylsulfonyl-4-methyl-5-chloropyrimidinyl)

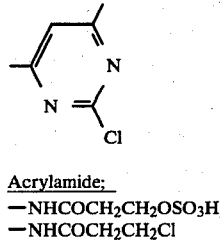

(2,4-dichloropyrimidinyl)

Acrylamide;

—NHCOCH$_2$CH$_2$OSO$_3$H   ($\beta$-sulfatopropionylamide)
—NHCOCH$_2$CH$_2$Cl        ($\beta$-chloropropionylamide)

Vinylsulfone;

—SO$_2$CH=CH$_2$            (vinylsulfonyl)

Dihalophthalazine;

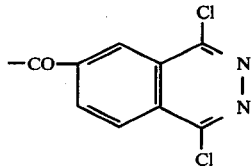

(1,4-dichlorophthalazine-6-carbonyl)

Halobenzothiazole;

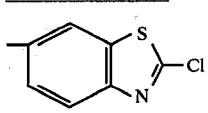

(chlorobenzothiazolyl)

Methylolamine;

-continued

—NHCH$_2$OH

The reactive residues that can be attached to the phthalocyanine molecules may be one or more in number and the same or different in kind.

The phthalocyanines that can be used in the present invention include both the non-metallic and the metal-containing phthalocyanines, such as copper-, iron-, nickel-, cobalt- and aluminum-phthalocyanines. Particularly preferred is the copper phthalocyanine.

The reactively modified phthalocyanine compound or the phthalocyanine compound having reactive group should preferably be water soluble. Many water-soluble phthalocyanine derivatives having reactive groups necessary for anchoring onto the organic solid material are commercially available. They are called "reactive phthalocyanine dyes."

The phthalocyanine compound having reactive group above have been disclosed, for example, in Patent Nos. GB836647, GB805562, GB866513, U.S. Pat. No. 3,268,548, GB948967, GB995796, GB1208553, etc.

The organic solid material on which the phthalocyanine is to be anchored can contain hydroxy, amino, mercapto, phenyl, or carboxamide groups which can react with the terminal groups of the phthalocyanine compound to form covalent linkages. Particularly preferable is a hydrophilic organic polymer capable of serving as an organic solid substrate in coupling with a phthalocyanine compound in this invention. Examples of the organic solid material are as follows. Polysaccharides, e.g., cellulose, starch and Sepharose (a product of Pharmacia Co.); polyvinyl alcohol, polypeptides, e.g., wool and silk; polyamides, e.g., nylon and polyacrylamide. These materials may be in the form of fiber (such as cotton, thread, and cloths produced from them), powder, beads, sintered plates, solid blocks, etc.

The reaction of the phthalocyanine compound having reactive groups with the organic solid material can be carried out according to the known procedure. For example, in the case of sulfato-ethylsulfone group-containing phthalocyanine compound, and cellulose fiber, the reaction can be carried out in the presence of a base in an aqueous media in accordance with the method described in U.S. Pat. No. 2,670,265.

The present invention can be illustrated by referring, for example, to a preferable embodiment wherein cellulose fiber is allowed to react with the phthalocyanine compound having sulfato-ethylsulfone group.

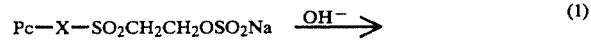 (1)

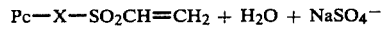

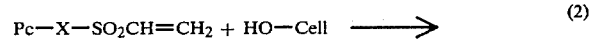 (2)

(Pc: phthalocyanine skeleton
X: bivalent group
Cell: cellulose chain)

The solid adsorbent bearing phthalocyanine groups thus prepared in often contaminated with unaltered phthalocyanine compound, as well as with other phthalocyanine derivatives produced in the reaction process. It is sometimes desirable to extract or remove such unaltered compound or contaminants by use of water-soluble organic solvents, such as dimethylsulfoxide (DMSO), pyridine, etc.

The phthalocyanine-containing solid adsorbent [hereafter referred to as phthalocyanine adsorbent(s)] thus obtained are capable of selectively adsorbing mutagenic substances dissolved substantially in solutions, particularly in an aqueous media. The mutagenic substances, when they are present in a very small amount in a solution, can further be concentrated by adsorption to the phthalocyanine adsorbents followed by elution of the adsorbed mutagens with a proper solvent.

For the adsorption of the mutagenic substances, the phthalocyanine adsorbent is added to the solution, particularly to the aqueous solution containing mutagenic substances, and agitation or shaking is applied thereto at a temperature of 0°–100° C., preferably at 15°–30° C. This operation may be carried out repeatedly. Alternatively, the phthalocyanine adsorbent is filled in a column and then a solution containing mutagenic substances may be passed through the column. A gaseous sample containing mutagenic substances may be passed through moistened phthalocyanine adsorbents.

The amount of phthalocyanine residue on the adsorbent to be used for adsorption of mutagens is preferably not less than one residue per one molecule of the mutagenic substance.

Mutagenic substances which can be treated with this invention include Trp-P-1, Trp-P-2 (3-amino-1-methyl-5H-pyrido[4,3-b]indole), Glu-P-1 (2-amino-6-methyldipyrido[1,2-a:3',2'-d]imidazole), Glu-P-2 (2-aminodipyrido[1,2-a:3',2'-d]imidazole), amino-α-carboline (2-amino-9H-pyrido[2,3-b]indole), aminomethyl-α-carboline (2-amino-3-methyl-9H-pyrido[2,3-b]indole), IQ (2-amino-3-methylimidazole[4,5-f]quinoline), 2-acetylaminofluorene, daunomycin, aflatoxin B$_1$ and polycyclic aromatic hydrocarbons in general [such as benzo(a)pyrene, 2-aminoanthracene and 2-nitropyrene]. The present invention is particularly effective for adsorbing mutagens having planar structures with not less than three fused-rings. All of the above-mentioned examples of mutagens possess three or more fused-rings.

The mutagenic substances adsorbed onto the phthalocyanine adsorbents can be desorbed in the following manner. Thus, the adsorbents containing the mutagenic substances adsorbed may be agitated or shaken in a solvent, for example, methanol, a methanol-aqueous ammonia solution, a methanol-hydrochloric acid solution or other neutral, basic or acidic organic solvents, at a temperature up to the boiling point of the solvent. When the phthalocyanine adsorbent is filled in a column and a solution containing the mutagenic substances is passed through it, the solvent above may be passed for the purpose of the desorption.

The solution containing the mutagenic substances thus desorbed can be used as such. Alternatively, a solution containing more concentrated mutagenic substances can be obtained by evaporation of the solvent. Mutagenic substances may be isolated by removal of the solvent by evaporation.

The presently invented phthalocyanine adsorbents can be reaily prepared by use of commercially available phthalocyanine reactive dyes. The invented phthalocyanine adsorbent is highly effective in adsorption of mutagenic substances, so that it may be used for removal of mutagens from the environment (e.g., foods, water, etc.) and for detection, isolation and identification of mutagens from various sources such as foods, river water, sea water, human body fluids (blood, urine, semen, etc.), feces, air, plants, soil, industrial products and industrial disposals.

Further detailed explanation on the working examples of this invention will be given below, but this invention is not limited thereto unless the purport is exceeded.

EXAMPLE (1) Examples of the preparation of a cellulose having chemically bonded phthalocyanine skeletons as ligand.

Into 600 ml of water placed in a 1 liter beaker 30 g of absorbent cotton was added. The mixture was slowly agitated and heated up to 30° C. Then, 2 g of Sumifix Turquoise Blue G [reactive dye made by Sumitomo Chemical Co., Ltd.: Color Index (C.I.), Reactive Blue 21; A mixture shown by the following formula],

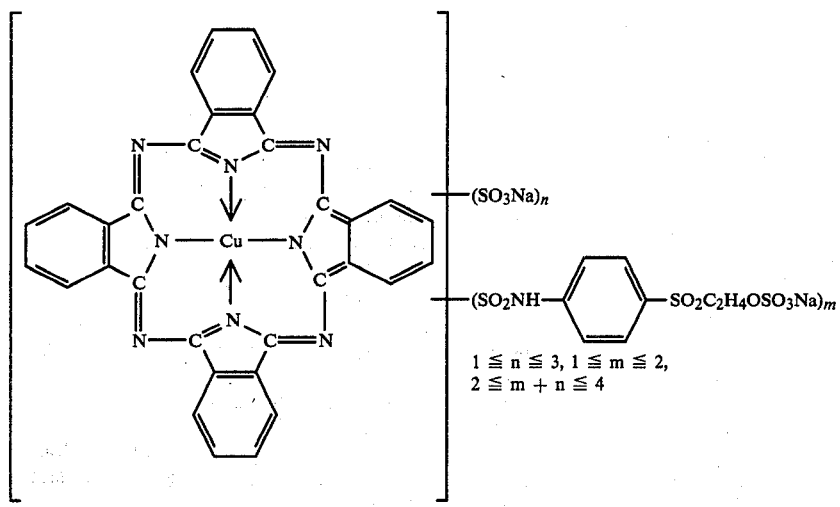

and 30 g of anhydrous sodium sulfate were added to it. The mixture was agitated for 20 minutes. Then, 12 g of sodium carbonate was added. After agitation for 15 minutes at 30° C., the temperature of the mixture was raised to 70° C. during 20 minutes. The reaction was allowed to continue for 60 minutes at 70° C.

The blue colored adsorbent cotton was separated by filtration using a Buchner funnel, and put into 900 ml of water containing 1.8 g of Monogen (a detergent made by Daiichi Kogyo Seiyaku Co., Ltd: sodium alkylbenzenesulfonate). The soaping was effected for 5 minutes at 100° C. The cotton was separated by filtration using a Buchner funnel, rinsed extensively with water, and dried. The cotton was then washed sequentially with dimethylsulfoxide, methanol-concentrated hydrochloric acid (volume ratio 50:1), methanol-concentrated ammonia water (volume ratio 50:1) and methanol, until the washing liquids gave no coloration. Then, the cotton was dried.

The blue absorbent cotton thus obtained was subjected to the analysis of its copper content according to the atomic absorption spectrum method. The content of copper was 0.065%. Accordingly, 1 g of the cotton should contain $1.0 \times 10^{-5}$ mol of phthalocyanine skeleton. This material is hereafter referred to as blue-cotton.

(2) Examples of the elimination through adsorption of the mutagenic substances using the cellulose having chemically bonded phthalocyanine skeletons as the ligand.

The blue-cotton (10 mg/ml) obtained in (1) was put into 5 ml of 0.9% aqueous sodium chloride solution containing the mutagenic substances at the concentration of $2 \times 10^{-5} - 5 \times 10^{-5}$ mole/l. The mixture was mechanically shaken for 30 minutes at room temperature (20° C.). Then, the blue-cotton was removed from the solution. A new sample of blue-cotton (10 mg/ml) was added to the solution and the mixture was shaken for 30 minutes in the same way.

The following table shows the extents of the adsorption of mutagens to the blue-cotton, which were calculated from the value of the mutagenic substance remaining in the solution when measured by ultraviolet absorption spectra. As a control, the adsorption extents for plain absorbent cotton, i.e. cotton not subjected to the dyeing, are also shown.

| | Adsorption extent (%) | |
|---|---|---|
| Mutagenic substances | Blue-cotton *1 | Plain absorbent cotton *2 |
| Trp—P—1 | 98 ± 0.5 | 46;47 |
| Trp—P—2 | 99 ± 0.5 | 38;43 |
| Glu—P—1 | 85 ± 0.5 | 9;9 |
| Glu—P—2 | 65 ± 1.0 | 6;8 |
| Amino-α-carboline | 89 ± 0.5 | 30;37 |
| Aminomethyl-α-carboline | 88 ± 0.6 | 26;46 |
| IQ | 85 ± 1.5 | 11;11 |
| 2-Acetylaminofluorene | 88 ± 1.4 | 6;7 |

Notes
*1: Averages of four experimental results are given, along with the s.d.
*2: Values found in two experiments are shown.

(3) Desorption of the adsorbed mutagenic substance.
[$^3$H]-Trp-P-2 was added to a sample of fresh human serum (2 ml), urine (5 ml) or 0.9% sodium chloride (saline) (5 ml), to make each concentration to $2 \times 10^{-9}$ mol/l.

The procedure given in (2) was carried out to make the blue-cotton to adsorb the mutagenic substance. Then, the blue-cotton was wiped with a paper towel. The cotton was again moistened with water and then wiped again with a paper towel.

The blue-cotton containing the adsorbed [$^3$H]-Trp-P-2 was put into 1 ml/20 mg (absorbent cotton) of methanol-concentrated ammonia water (50:1 volume ratio), and the mixture was shaken for 15 minutes at room temperature for the purpose of extraction. The blue-cotton was taken out and wiped with paper towel. Again, the extraction procedure was repeated by use of the same amount of the methanol-concentrated ammonia water. These 2 lots of methanol-concentrated ammonia extracts were combined. Quantitative analysis of the radioactivity of [$^3$H]-Trp-P-2 in the mixture was carried out and the recovery was calculated from the analytical value. The results as shown in the following table were obtained.

| Solvent | [$^3$H]Trp—P—2 concentration (dpm/ml) | Residual amount (dpm/ml) after the adsorption with the blue-cotton | Adsorption extent (%) | Amount extracted with methanol-concentrated ammonia water (dpm/ml) | Recovery (%) |
|---|---|---|---|---|---|
| Serum | 9,780 | 1,390 ± 7[a] | 85.8 | 8,009 ± 272[a] | 81.9 |
| Urine | 9,780 | 881 ± 29[a] | 91.0 | 8,960 ± 200[a] | 91.6 |
| Saline | 11,430 | 757 ± 27[b] | 93.4 | 10,238 ± 209[b] | 89.6 |

Notes
[a]Average of three measurements
[b]Average of five measurements

Excellent results in the adsorption of mutagenic substances are also obtained when adsorbent cottons and the following reactive dyes are used in place of the reactive dye described above.

Sumifix Turquoise Blue H-GF (Reactive dye of Sumitomo Chemical Co., Ltd.: C.I. Reactive Blue 15)

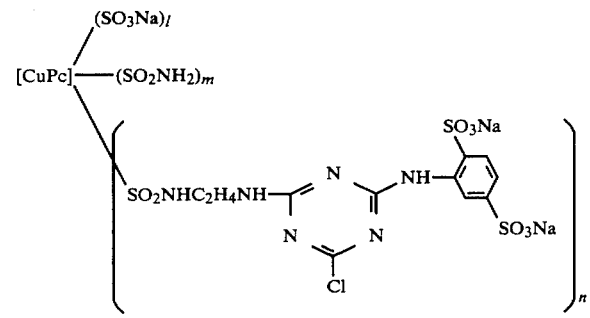

CuPc: copper phthalocyanine skeleton
$1 \leqq 1 + m \leqq 3, 3 \leqq 1 + m + n \leqq 4, 1 \leqq n \leqq 2,$
$1 \leqq 1 \leqq 3$ Sumifix Turquoise Blue GS (Reactive dye of Sumitomo Chemical Co., Ltd.: C.I. Reactive Blue 118).

Sumifix Turquoise Blue BF (Reactive dye of Sumitomo Chemical Co., Ltd.: C.I. Reactive Blue 148).

C.I. Reactive Blue 75 (Cibacron Pront Turquoise G: Reactive dye of Ciba-Geigy).

C.I. Reactive Blue 116 (Levafix Turquoise Blue E-BA: Reactive dye of Bayer.).

C.I. Reactive Blue 105 (Levafix Turquoise Blue P-BRA: Reactive dye of Bayer.).

C.I. Reactive Blue 18 (Cibracron Turquoise Blue TG-E: Reactive dye of Ciba-Geigy).

C.I. Reactive Blue 41 (Cibacron Turquoise Blue 2G-E: Reactive dye of Ciba-Geigy).

C.I. Reactive Blue 71 (Procion Turquoise H-A: Reactive dye of I.C.I.)

C.I. Reactive Blue 25 (Procion Brilliant Blue H-5G: Reactive dye of I.C.I.)

C.I. Reactive Blue 80 (Levafix Turquoise Blue E-4G: Reactive dye of Bayer).

C.I. Reactive Blue 3 (Procion Brilliant Blue H-7G: Reactive dye of I.C.I.).

C.I. Reactive Blue 72 (Cibracron Turquoise Blue GR-D: Reactive dye of Ciba-Geigy).

We claim:

1. A method treatment of a mutagen-containing solution, which comprises adsorption of a mutagenic substance present substantially in a solution by a solid adsorbent bearing a covalently bound phthalocyanine compound, said adsorbent being prepared by coupling a phthalocyanine compound having a reactive group with an organic solid material, said mutagenic substance having a planar structure with not less than 3 fused rings.

2. A method according to claim 1, wherein adsorbed mutagenic substances are desorbed from said adsorbent following the adsorption.

3. A method according to claim 1, wherein the phthalocyanine compound having a reactive group is a copper phthalocyanine compound having reactive groups.

4. A method according to claim 1, wherein the organic solid material is a polymer containing hydroxy residues.

5. A method according to claim 1, wherein the organic solid material is a cellulose substance.

6. A method according to claim 1, wherein the mutagenic substances are those having the planar structure with not less than 3 fused aromatic rings.

7. A method according to claim 1, wherein the reactive group of the phthalocyanine compound is a member selected from the following; dihalotriazine, monohalotriazine, trihalopyrimidine, sulfato-ethylsulfone, dihaloquinoxaline, dihalopyridazone, sulfato-ethylsulfonamide, mono- or dihalopyrimidine, acrylamide, vinylsulfone, dihalophthalazine, halobenzothiazole, and methylol amine.

8. A method according to claim 1, wherein the solution is an aqueous solution.

9. A method according to claim 1 wherein the mutagenic substance is Trp-P-1, Trp-P-2, Glu-p1, Glu-p2, amino-a-carboline, amonomethyl-a-carboline, IQ, 2-acetylaminofluorene, daunomycin, aflatoxin B$_1$, benzopyrene, 2-aminoanthracene or 2-nitropyrene.

10. A method according to claim 1 wherein the mutagenic substance is a polycyclic aromatic hydrocarbon.

11. A method for treatment of a mutagen-containing solution, which comprises adsorption of mutagenic substances present substantially in a solution by solid adsorbent bearing covalently bound phthalocyanine compound, said adsorbent being prepared by the step of making phthalocyanine reactive by introducing reactive terminal group and the step of coupling said reactive phthalocyanine compound with an organic solid material, said mutagenic substances having a planar structure with not less than 3 fused rings.

12. A method according to claim 11 wherein the fused rings are fused aromatic rings.

* * * * *